US008930739B2

(12) United States Patent
Kim et al.

(10) Patent No.: US 8,930,739 B2
(45) Date of Patent: Jan. 6, 2015

(54) MEMORY CONTROLLER

(75) Inventors: Kwan-ho Kim, Suwon-si (KR); Jong-in Kim, Yongin-si (KR); Young-wook Jang, Yongin-si (KR); Dae-woong Kim, Seoul (KR); Bong-chun Kang, Ansan-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1207 days.

(21) Appl. No.: 12/272,100

(22) Filed: Nov. 17, 2008

(65) Prior Publication Data

US 2009/0157986 A1    Jun. 18, 2009

(30) Foreign Application Priority Data

Nov. 15, 2007    (KR) .................. 10-2007-0116769

(51) Int. Cl.
*G06F 1/00* (2006.01)
*G06F 1/04* (2006.01)
*G06F 13/42* (2006.01)

(52) U.S. Cl.
CPC ................... *G06F 13/4239* (2013.01)
USPC ............ 713/500; 713/501; 713/502

(58) Field of Classification Search
USPC ................................................ 713/500
See application file for complete search history.

(56) References Cited

U.S. PATENT DOCUMENTS

| 6,594,748 B1 * | 7/2003 | Lin ........................ 711/167 |
| 2007/0058479 A1 * | 3/2007 | Matsui ...................... 365/233 |
| 2007/0260778 A1 * | 11/2007 | Lai et al. ..................... 710/52 |

FOREIGN PATENT DOCUMENTS

| JP | 58029195 | 2/1983 |
| JP | 11317072 | 11/1999 |
| JP | 2005327382 | 11/2005 |
| KR | 1020070030691 | 3/2007 |
| KR | 1020070043646 | 4/2007 |

OTHER PUBLICATIONS

First Office Action issued by Korean Patent Office dated Dec. 30, 2013 in corresponding Korean Application No. 10-2007-0116769.

* cited by examiner

*Primary Examiner* — Kim Huynh
*Assistant Examiner* — Vincent Chang
(74) *Attorney, Agent, or Firm* — F. Chau & Associates, LLC

(57) ABSTRACT

A memory controller includes an digitally programmable delay unit having a selectable delay time receiving a read-enable signal and outputting a delayed read-enable signal. The delay time is selected in response to an externally applied delay-control signal. A sampling unit in the memory controller outputs data received from a separate memory, in synchronization with the delayed enable signal. The delay time may be a multiple of the period of a clock signal.

21 Claims, 2 Drawing Sheets

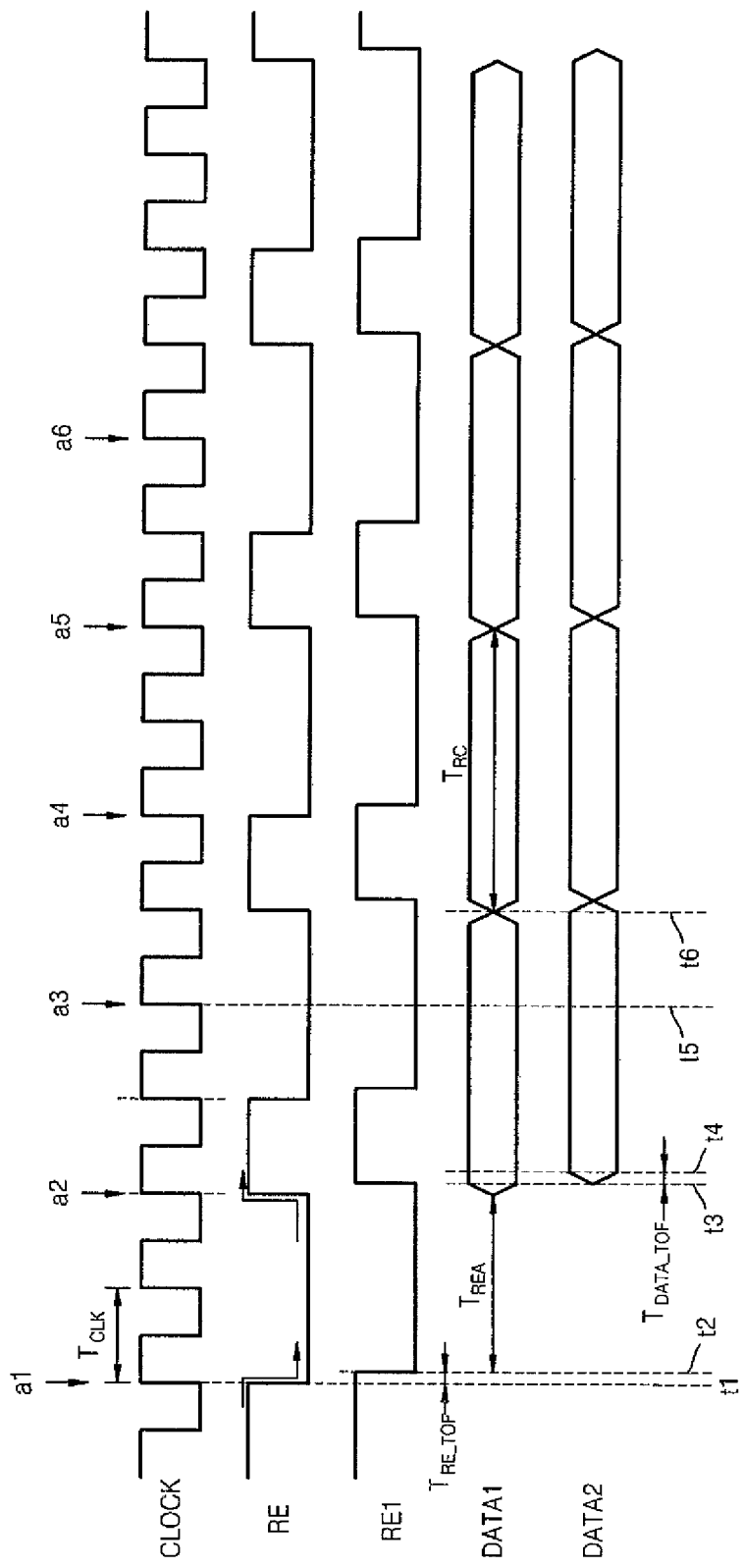

MEMORY CONTROLLER

CROSS-REFERENCE TO RELATED APPLICATIONS

This application claims the benefit of Korean Patent Application No. 10-2007-0116769, filed on Nov. 15, 2007, in the Korean Intellectual Property Office, which is incorporated by reference herein in its entirety.

BACKGROUND

1. Technical Field of the Invention

The invention relates to a memory controller, and more particularly, to a memory controller capable of precisely controlling data output time.

2. Description of the Related Art

In many computer systems, a memory controller is used to efficiently manage the read and write transactions between a processor (or processors) and one or more random access memory (RAM) devices. Some memory controllers has a buffer (e.g., FIFO memory) that temporarily stores data to make data writing in a flash memory and data reading therefrom smoother. To perform a data output (read) operation synchronized with the operational clock (external clock) of a host system, the memory controller may need to compensate for memory access latency. When the memory device detects a falling edge of a read-enable signal RE, a read operation starts in the memory device. An activated read-enable (RE) signal (e.g., transmitted through the memory controller to the memory device) enables the memory device to output (read out) stored data, and the activated read-enable signal may then propagate back through the memory controller to indicate or control the availability of valid read data. Read data may not be instantaneously available (output) from some memory devices at the same time that the read-enable signal is activated. The access time $T_{REA}$ of a memory depends upon the characteristics of the individual memory device. Some memory devices may have different memory access latencies $T_{REA}$, such that read data may be output (available) later from some memory devices than from others. Thus, there is a need for a memory controller capable of variably delaying the propagation of a read-enable signal and read data in the memory controller.

Delay lines are used within digital circuits such as board level systems and integrated circuit (1C) devices, including field programmable gate arrays (FPGAs) and microprocessors, to control the timing of various signals in the digital circuits. A simple delay line receives an input signal on an input terminal and provides an output signal on an output terminal, the output signal being a copy of the input signal delayed by a certain time period that is referred to as the delay D of the delay line. More complicated delay lines are tunable (e.g., digitally programmable) so that delay D of the delay line can be adjusted.

SUMMARY

Connections between a memory controller formed on one integrated circuit and a memory device formed on a separate integrated circuit may produce an unpredictable propagation delay and access time, which may produce a read error. In some memory devices, the access time may vary dynamically, which may cause a read error. An aspect of the invention provides a memory controller that can prevent a read error generated due to a variation in the access time during a data read so that the maximum performance can be obtained during data reading.

According to an aspect of the invention, a memory controller comprises: an digitally programmable delay unit receiving a read-enable signal and outputting a delayed read-enable signal having a variable delay time that varies in response to an externally applied delay-control signal (e.g., a digital delay selection signal); and a sampling unit outputting data transmitted from a memory in synchronization with the enable signal, wherein the delay time is a multiple of a period of a clock signal.

The digital delay-control signal is a signal controlling the delay time though the digitally programmable delay unit and is applied by a user, or by an external circuit.

The digitally programmable delay unit comprises a delay unit (e.g., a multi-tap delay block) receiving the read-enable signal, delaying a received read-enable signal by an interval of a multiple of the period of the clock signal, and outputting the delay signals having different delay times, and a switch unit selecting any one of the delay signals and outputting the selected delay signal as the enable signal, in response to the digital delay-control signal.

The delay unit comprises a plurality of delay elements, each of which delays an input signal by an interval of a multiple of the period of the clock signal and outputs the delayed signal.

The switch unit comprises a delay selector outputting a switching control signal that determines the delay time according to the digital delay-control signal, and a switching device selectively outputting any one of the delay signals in response to the switching control signal.

The delay unit comprises n number of delay cells in which an output terminal of a k-th delay cell is connected to an input terminal of a (k+1)th delay cell, where k is a natural number that is not less than 1 and not greater than n−1, and the first delay cell receives the read-enable signal, delays the received read-enable signal by a multiple of the period of the clock signal, and outputs a delayed signal in synchronization with the clock signal, where n is a natural number.

The switching device is formed of a multiplexer.

The sampling unit comprises a latch circuit that receives the enable signal and data and outputs the data signal, in synchronization with the enable signal.

BRIEF DESCRIPTION OF THE DRAWINGS

The accompanying figures provide a further understanding of the present invention, and are incorporated in and constitute a part of this specification. The drawings illustrate exemplary embodiments of the present invention and, together with the description, serve to explain principles of the present invention. In the figures:

FIG. 2 is a timing diagram for explaining the operation of the memory controller of FIG. 1.

DETAILED DESCRIPTION OF THE EMBODIMENTS

Figure 1:
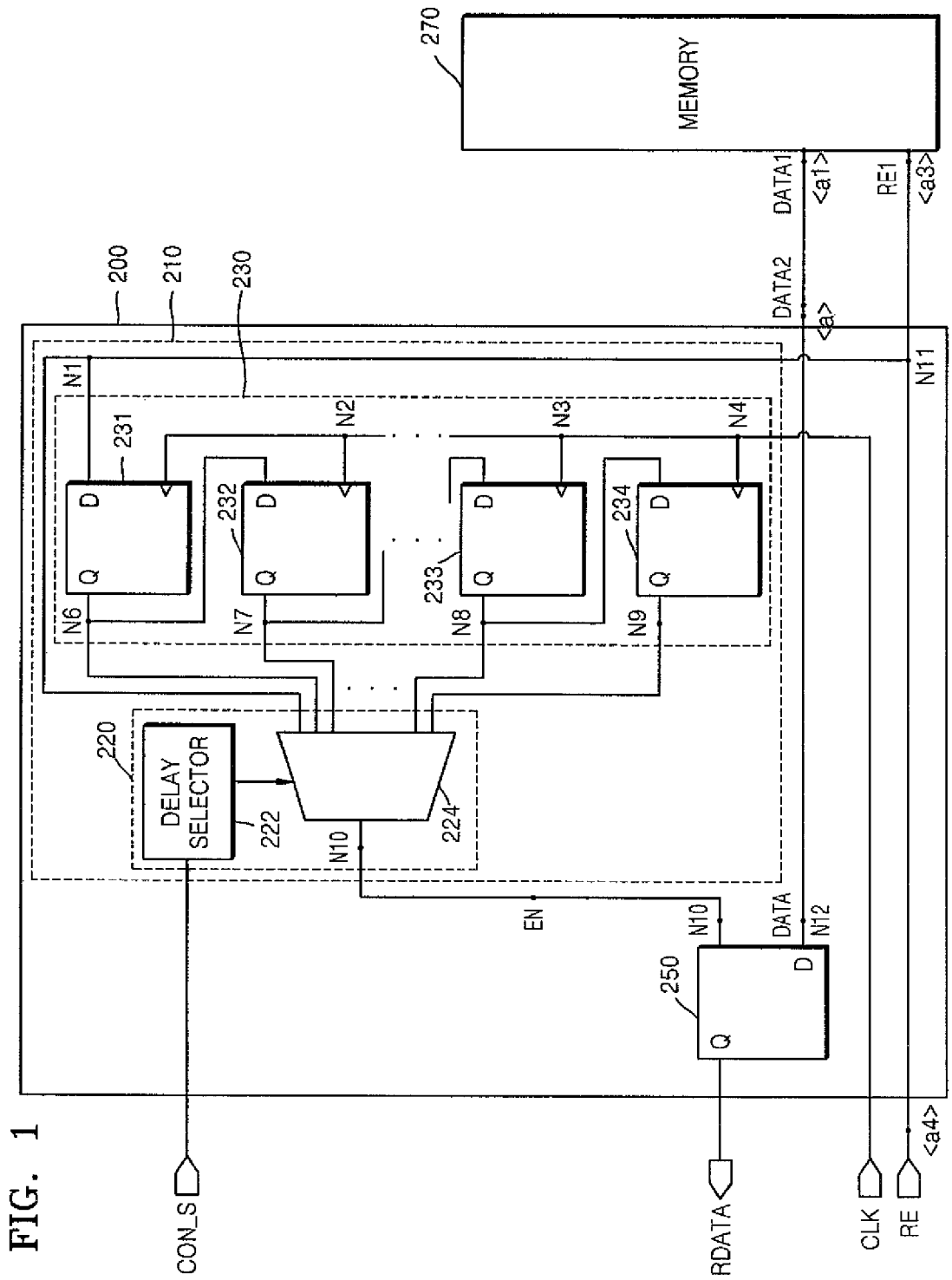
FIG. 1 is a block diagram of a memory controller, according to an exemplary embodiment of the invention.

FIG. 1 is a block diagram of a memory controller 200 according to an exemplary embodiment of the invention. Referring to FIG. 1, the memory controller 200 includes a programmable delay unit 210 and a sampling unit 250.

The programmable delay unit 210 is a digitally programmable delay unit configured to delay an input read-enable signal RE by a variable delay time, varying based upon an externally applied digital control signal CON_S, and outputs an enable signal EN. The variable delay time is a multiple of a period of a clock signal. Thus, when the period of a clock signal CLK is period T, a delay time is nT, where "n" is a natural number to be multiplied by period T.

The sampling unit 250 receives data DATA transmitted from a data source (e.g., a memory 270). When the enable signal EN is applied in an activated state, the received data DATA is output as read data RDATA. The active enable signal EN may be predetermined as a logic high or logic low level according to user settings.

The digital delay-control signal CON_S is a signal that controls the delay time $t_d$ ($t_d$=nT minus T, where n is a natural number selected based upon an externally applied digital delay-control signal CON_S. In a preferred embodiment, n is an integer. For example, when the digital delay-control signal CON_S is input as an m-bit code, a code of "00001" makes the amount of delay 1 T, a code of "00010" makes the amount of delay 2 T, and a code of "00011" makes the amount of delay 3 T.

The programmable delay unit 210 may include a d multi-tap delay block 230 and a switch unit 220. The multi-tap delay block 230 receives the read-enable signal RE and repeatedly delays the input read-enable signal RE for a total delay time interval of a multiple (n times) of the period of the clock signal CLK. For example, when the read-enable signal RE is input at a time point t1 and the period of the clock signal CLK is T, the multi-tap delay block 230 outputs the read-enable signal RE at each of time points t1+T, t1+2 T, t1+3 T, etc. and t1+nT.

Preferably, the multi-tap delay block 230 may include a plurality of delay elements e.g., clocked D-Q flip flops 231, 232, 233, and 234 that are operated based on a clock signal CLK. Each of the delay elements (e.g., flops 231, 232, 233, and 234) may be a flip-flop, and the number n of delay elements (e.g., the value of integer n) may be predetermined by a designer considering the access time of the memory controller 200. The access time denotes the time period between the time point when the host device requests data and the time point when effective data is available for use. Thus, the time point from when the read-enable signal RE is activated to the time point just before the memory 270 starts a read operation in response to the read-enable signal RE is the access time. When the access time is 10 T (i.e., n=10), ten times of the period of the maximum clock signal CLK, then ten delay elements may be provided.

In the following description, for convenience of explanation, the delay element 231, which first receives the read-enable signal RE, is referred to as the first delay element 231 and the delay elements sequentially arranged after the first delay element are referred to as the second, third, ..., n-th delay element 232, 233, ..., 23n-th, where n is a natural number. Each of the n delay elements may implemented by an edge-triggered d-type (DQ) flip-flop. The D input of a D-type "positive edge-triggered" flip-flop is sampled on the occurrence of the rising edge of the clock signal CLK (see, e.g., the rising edge of the CLOCK signal at time point t1 in FIG. 2), and the sampled D input is latched and transferred to the output Q. During all other conditions of the signal CLK, the input D is ignored.

The first delay element (DQ flip-flop) 231 receives the read-enable signal RE through an input terminal D via a first node N1, and is operated in synchronization with the clock signal CLK. The first delay time $t_{d1}$ of the first delay element (DQ flip-flop) 231 is 1 T. As described above, the time point synchronization is an interval of one cycle (period T) of the clock signal CLK. For example, when the first delay element 231 receives the read-enable signal RE at a time point t2, the read data RDATA is output from a terminal Q of the first delay element (DQ flip-flop) 231 at a time point t2+T.

The second delay element 232 receives a data signal output from the first delay element 231 through its input terminal D at the time point t2+T, the second delay element 232 outputs from its output terminal Q at a time point t2+2 T. In general, the (k+1)th delay element receives a signal output from output terminal Q of the kth delay element at the time point t2+kT, and the read data RDATA is output from the terminal Q of the (k+1)th delay element at a time point t2+(k+1)T, where k is a natural number that is not less than 1 and not greater than n.

That is, since each delay element outputs an input signal in synchronization with the clock signal CLK, each delay element has a delay time of 1 T, which is one period of the clock signal CLK. The signal output by each of the delay elements 231, 232, 233, and 234 through the terminal Q are input to the switch unit 220.

The switch unit 220 receives the inputs of signals output from the first through nth delay elements 231, 232, ..., 233, and 234 and selectively outputs one of the input signals. The switch unit 220 may receive the read-enable signal RE. Thus, the switch unit 220 selectively outputs any one of the read-enable signal RE and the output signals of the first through nth delay elements 231, 232, ... 233, and 234. The switch unit 220 may include a delay selector 222 and a switching device 224.

The delay selector 222, in response to the digital delay-control signal CON_S, outputs a switching control signal corresponding to the digital delay-control signal CON_S. The switching control signal is a signal for controlling the amount of delay of the read-enable signal EN. Thus, the switching control signal selects any one of the read-enable signal RE and the output signals of the first second, third, and fourth delay elements 231, 232, 233, and 234 so that the read-enable signal EN can have a delay amount according to the digital delay-control signal CON_S.

The switching device 224, in response to the switching control signal, selects and outputs one of the read-enable signal RE and the output signals of the first, second, third, and fourth delay elements 231, 232, 233, and 234, to a tenth node N10 that is at an output terminal of the switching device 224. The switching device 224 may be a multiplexer (MUX).

The sampling unit 250 includes sampling devices such as flip-flops or latches. The sampling unit 250, in response to the enable signal EN output from the switch unit 220, outputs the data DATA transmitted to a twelfth node N12 at an input terminal of the sampling unit 250, as the read data RDATA.

FIG. 2 is a timing diagram for explaining the operation of the memory controller 200 of FIG. 1. Referring to FIG. 2, a signal "CLOCK" may denote the above-described clock signal CLK, and a signal "$T_{CLK}$" denotes one cycle (the period) of the clock signal CLK. In alternative embodiments, the signal "CLOCK" may be produced by frequency-dividing the above-described clock signal CLK In other embodiments, the signal "° CLOCK" may be independent of the above-described clock signal CLK When the read-enable input pin of the memory device 270 receives a falling edge of the read-enable signal RE, a read operation starts. At a rising edge of the read-enable signal RE, the read operation stops. Thus, when the read-enable signal RE is in a logic low level, the memory controller 200 reads the data stored in the memory 270, and the read operation is performed. The memory controller 200 transmits the read-enable signal RE to the memory 270. The propagation (delay) time of the read-enable signal RE transmitted from the memory controller 200 to the memory 270 is $T_{RE\_TOF}$. Thus, $T_{RE\_TOF}$ is the time it takes for the read-enable signal RE to be transmitted from the input node <a4> of the memory controller 200 at a time point t1 to the input node <a3> of the memory device at time point t2. Thus, the RE signal transmitted from the memory controller 200 to the memory 270 has the waveform as shown of the read-enable signal RE1 of FIG. 2.

The access time of the memory 270 is $T_{REA}$. The time $T_{DATA\_TOF}$ is the propagation (delay) time for transmitting the read data DATA1 out from the memory 270 into the memory controller 200. Thus, the time interval $T_{DATA\_TOF}$ is a propagation delay time that occurs when the read data DATA1 is transmitted from data output node <a1> of the memory device 270 a time point t3 to the data input node <a> of the memory controller 200 a time point t4.

Thus, the time interval from the time point when the read-enable signal RE is a falling edge to the time point when the data read from the memory 270 is available (can be used by the memory controller 200) is a time interval between a time point t1 and a time point t4. Thus, the time interval from the time point t1 to the time point t4 is the overall access time. The overall access time may not be an integer multiple of the period of the CLOCK signal. Referring to a data DATA1, even when a data read operation starts at a time point t3, the read data can be output only after a predetermined time has elapsed. Thus, a set up time must be secured for all data read operations, where the set up time signifies a time needed to stabilize data. Also, a hold time must be secured. where the hold time is a time to maintain the state of the read data for a predetermined period of time, which is requested by the memory controller 200.

Referring to FIG. 2, the time from the time point t3 to a time point t5 may be a sum of the set up time and the hold time. For reference, a time TRC signifies a time needed for a predetermined unit of data to be output.

As shown in FIG. 2, at the time point t5, the read data DATA1 can be used by the memory controller 200. However, the time point t5 is a position after the time point of <a2> $t_3$ when the read-enable signal RE is raised. Accordingly, since data, for example, data DATA1, is output at a time point when the read operation of the memory 270 is deactivated by the read-enable signal RE, the requested data DATA is not properly transmitted. That is, a data read error problem is generated.

In an exemplary embodiment of the invention shown in FIG. 1, the read-enable signal RE is delayed by a multiple of the cycle of the clock signal CLK considering the access time. Thus, as shown in FIG. 2, as the read-enable signal RE is delayed by 3 T of the overall read-enable signal RE, e.g., three cycles of the clock signal CLK, a problem that the read data is not timely available can be prevented.

While the invention has been particularly shown and described with reference to exemplary embodiments thereof, it will be understood that various changes in form and details may be made therein without departing from the spirit and scope of the following claims.

What is claimed is:

1. A memory controller comprising:
a programmable delay unit configured to receive a periodic read-enable signal and to output a delayed periodic read-enable signal having a variable delay time selected in response to a delay-control signal; and
a sampling unit configured to output, in synchronization with the delayed periodic read-enable signal, data read out from a memory coupled to the memory controller, wherein the programmable delay unit generates a plurality of delay signals having different delay times by repeatedly delaying the received read-enable signal by a time interval equal to a first multiple of a period of a clock signal, and selectively outputs one of the delay signals as the delayed read-enable signal, wherein the selected delay time of the delayed read-enable signal is the first multiple of the period of the clock signal.

2. The memory controller of claim 1, wherein a period of the periodic read-enable signal is a second multiple of the clock signal.

3. The memory controller of claim 2, wherein the first multiple is an integer and is less than the second multiple.

4. The memory controller of claim 3, wherein the first multiple m1 is an integer and the second multiple m2 is an integer, and wherein at least one of the first multiple and the second multiple is an odd integer, and wherein the programmable delay unit is a digitally programmable delay unit.

5. The memory controller of claim 2, wherein the delay-control signal controls the delay time to approximately equal to an access time of the memory controller.

6. The memory controller of claim 1, wherein the first multiple is one and the second multiple is an integer, and wherein the programmable delay unit is a digitally programmable delay unit.

7. The memory controller of claim 1, wherein the delay-control signal is a digital signal controlling the delay time of the programmable delay unit and is supplied by a user.

8. The memory controller of claim 1, wherein the delayed read-enable signal is generated by delaying the read-enable signal by the variable delay time.

9. The memory controller of claim 1, wherein the sampling unit comprises a latch circuit that receives the delayed read-enable signal and data and outputs the data signal, in synchronization with the delayed read-enable signal.

10. The memory controller of claim 1, wherein the programmable delay unit comprises:
a multi-tap delay block receiving the read-enable signal, configured to repeatedly delay by a time interval of the first multiple of the period of the clock signal, and to output a plurality of delay signals having different delay times; and
a switch unit receiving the plurality of delay signals and the read-enable signal, configured to select any one of the delay signals and the read-enable signal in response to the delay-control signal, and to output the selected signal as the delayed read-enable signal.

11. A memory controller, comprising:
a programmable delay unit configured to receive a periodic read-enable signal and to output a delayed periodic read-enable signal having a variable delay time selected in response to a delay-control signal,
wherein the programmable delay unit comprises:
a multi-tap delay block receiving the read-enable signal, and outputting a plurality of delay signals having different delay times by repeatedly delaying the received read-enable signal by a time interval equal to a first multiple of a period of a clock signal; and
a switch unit configured to select one of the plurality of delay signals and to output the selected delay signal as the delayed read-enable signal, in response to the delay-control signal.

12. The memory controller of claim 11, wherein the multi-tap delay block comprises a plurality of delay cells, each of which delays an input signal by a time interval of the first multiple of the period of the clock signal and outputs the delayed signal.

13. The memory controller of claim 12, wherein the number n of delay cells is predetermined according to a rated maximum value of an access time of the memory controller.

14. The memory controller of claim 11, wherein the switch unit comprises:
- a delay selector configured to output a switching control signal that controls the delay time according to the delay-control signal; and
- a switching device configured to select and output one of the delay signals in response to the switching control signal.

15. The memory controller of claim 14, wherein the switching device is a multiplexer.

16. The memory controller of claim 11, wherein the multi-tap delay block comprises a plurality n of delay cells in which an output terminal of a k-th delay cell is connected to an input terminal of a (k+1)th delay cell, wherein k is a natural number that is not less than 1 and not greater than n−1, and the first delay cell receives the read-enable signal, delays the received read-enable signal by the first multiple of the period of the clock signal, and outputs a delayed read-enable signal in synchronization with the clock signal, wherein n is a natural number.

17. The memory controller of claim 16, wherein each of the delay cells is operated in synchronization with the clock signal, delays a signal input to its input terminal by one period of the clock signal, and outputs a delayed signal to the switching unit.

18. The memory controller of claim 17, wherein each of the delay cells is formed of a flip-flop.

19. The memory controller of claim 11, further comprising:
- a sampling unit configured to output, in synchronization with the delayed periodic read-enable signal, data read out from a memory coupled to the memory controller, wherein the delay time is a first multiple of the period of a clock signal.

20. A memory controller comprising:
- a digitally programmable delay unit having a variable delay time configured to receive a periodic read-enable signal and to output a delayed periodic read-enable signal; and
- a sampling unit configured to latch and output, in synchronization with the delayed periodic read-enable signal, data read out from a memory coupled to the memory controller, wherein the memory controller is formed on a first integrated circuit and the memory is formed on a separate second integrated circuit, wherein the variable delay time is a first multiple of the period of a clock signal and wherein the first integer is selected in response to an externally applied delay-control signal, and wherein the programmable delay unit comprises:
- a multi-tap delay block receiving the read-enable signal, configured to repeatedly delay by a time interval of the first multiple of a period of the clock signal, and to output a plurality of delay signals having different delay times; and
- a switch unit receiving the plurality of delay signals and the read-enable signal, configured to select any one of the delay signals and the read-enable signal in response to the delay-control signal, and to output the selected signal as the delayed read-enable signal.

21. The memory controller of claim 20, wherein the delay-control signal is a digital signal controlling the delay time of the digitally programmable delay and is supplied by a user.

* * * * *